RUDOLF SOLISCH
WERNER WAGNER
Inventors.

United States Patent Office 3,351,412
Patented Nov. 7, 1967

3,351,412
HIGH-SPEED SEVEN COMPONENT
CAMERA OBJECTIVE
Rudolf Solisch, Kreuznach, and Werner Wagner, Odernheim an der Glan, Germany, assignors to Joseph Schneider & Co., Optische Werke, Bad Kreuznach, Germany, a corporation of Germany
Filed June 24, 1964, Ser. No. 377,744
Claims priority, application Germany, July 3, 1963, Sch 33,490
2 Claims. (Cl. 350—207)

ABSTRACT OF THE DISCLOSURE

High-speed camera objective with a relative aperture of 1:0.95, consisting of seven components including a pair of menisci with confronting concave surfaces defining a diaphragm space therebetween and constituting the fourth and fifth component, respectively, of the system, the remaining components being singlets and positively refracting with the exception of one component ahead of the third meniscus.

Figure 1:
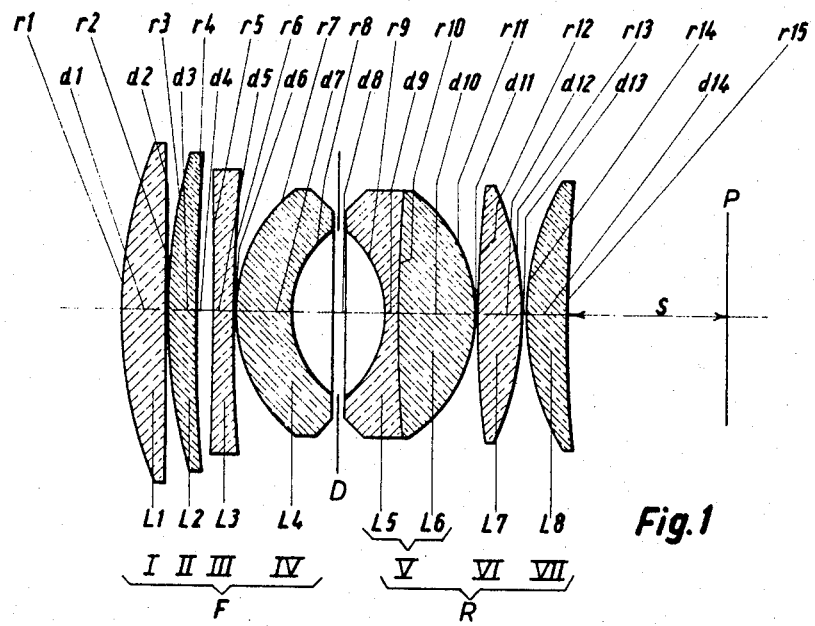

Our present invention relates to a high-speed objective for photographic and cinematographic cameras, more particularly an objective whose back-focal length equals or exceeds half its overall focal length.

In commonly assigned application Ser. No. 355,829, filed March 30, 1964, by Rudolf Solisch and Walter Wöltche, there has been disclosed a camera objective of this type which satisfies the requirement of combining a high aperture ratio, on the order of 1:1, with elimination of the previously observable substantial drop in luminous intensity at the corners of the image field. With the objective disclosed in the above-identified application, it has been possible to achieve an aperture ratio of 1:0.95 and a luminosity ratio along the image diagonal of about 1:1.3.

An objective having these characteristics is essentially composed of six members of which the middle two, i.e. the third and fourth members as counted from front to rear or from the object side to the image side of the system, are negatively refracting and are constituted by a pair of menisci facing each other with their concave sides across a relatively large air space, generally utilized as a diaphragm space; the remaining members are of positive refractivity.

The general object of our present invention is to provide an improved objective of the type described in which the aforestated advantages of large aperture ratio and high corner luminosity are utilizable over an image field of increased diameter, with simultaneous realization of high resolving power, very small chromatic aberration and sharp contrasts as required, for instance, in a television camera.

We have found, in accordance with our present invention, that this object can be realized by the inclusion in the front component of the objective, i.e. in the group of lenses disposed on the object side of the diaphragm space, of a negatively refracting lens disposed ahead of the first negative meniscus adjoining the diaphragm space, this negatively refracting additional lens being bounded—in common with the positive members of the front component—by relatively flat surfaces whose radii of curvature are larger than the overall focal length of the objective system. This additional lens, aside from being of low power, may also have a low dispersion constant of Abbé number $\nu$ so that, according to a more particular feature of our invention, the sum of the dispersion constants of the one negative and two positive lens members ahead of the first negative meniscus has an upper limit of substantially 175.

Although the present improvement increases the number of lens members by one, it also simplifies the objective by permitting the use of a positive singlet for the next-to-last member of the system, i.e. for the middle lens member of the rear component, in lieu of the doublet employed in that position in the system of the copending application referred to; the radius of the front surface of this middle member may, as in the system of the copending application, have an absolute value at least equal to, and preferably greater than, three times that of the radius of curvature of the front surface of the rearmost lens member immediately following. Furthermore, as in that prior system, the overall axial thickness of the front component should be less than or at most equal to that of the rear component, the axial width of the diaphragm space equaling at least 25% of the overall focal length. Pursuant to a further feature of our invention, the sum of the axial thicknesses and air spaces of the first three lens members of the front component should be less than or at most equal to 0.4 times the combined focal lengths of these three lens members.

The additional negative lens of the front component may constitute either the first member or one of the subsequent members of that group and may, if desired, be cemented onto one of the associated positive lens members to form a doublet therewith.

Figure 2:
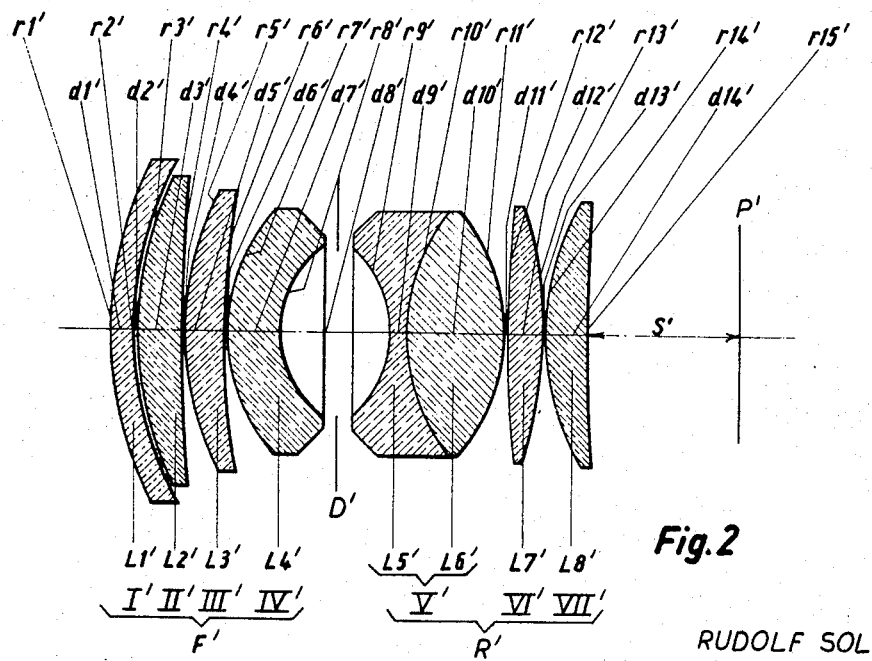

The invention will be described hereinafter in greater detail, reference being made to the accompanying drawing in which FIGS. 1 and 2 diagrammatically illustrate two representative embodiments.

The camera objective shown in FIG. 1 consists of a front component F and a rear component R. Component F is constituted by a front member I in the form of an almost planoconvex positive meniscus L1 of radii $r1$, $r2$ and thickness $d1$; a member II, represented by a similarly shaped positive meniscus L2 with radii $r3$, $r4$ and thickness $d3$, separated from lens L1 by an air space $d2$; a negatively refracting third member III in the form of a planoconcave lens L3 with radii $r5$, $r6$ and thickness $d5$, separated from lens L2 by an air space $d4$; and a member IV in the shape of a negative meniscus L4 with a rearwardly facing concave side, this member following the negative lens L3 with an air space $d6$ and having radii $r7$, $r8$ and a thickness $d7$.

A large air space $d8$, accommodating a diaphragm D, separates component F from component R whose first member V is a meniscus-shaped negative doublet composed of a biconcave lens L5 (radii $r9$, $r10$ and thickness $d9$) and a biconvex lens L6 (radii $r10$, $r11$ and thickness $d10$), separated by an air space $d11$ from the middle member VI of that component which is the penultimate member of the system and has the form of a biconvex lens L7 (radii $r12$, $r13$, and thickness $d12$), the rearmost member VII of this component and of the system being a positive meniscus L8 (radii $r14$, $r15$ and thickness $d14$) following the lens L7 with a spacing $d13$. The image plane P of the system is separated from the last vertex (surface $r15$) by the back-focal length $s$.

Representative values of the parameters $r1$ to $r15$ and $d1$ to $d14$ of the illustrated objective, based on an overall focal length $f$ of 100 units (e.g. millimeters), along with their refractive indices $n_e$ (for the $e$ line of the spectrum) and the corresponding Abbé numbers $\nu_e$ (based on the same spectral line) are given in the following Table I for an objective system whose useful image field has a diameter or frame diagonal in excess of 60% of the overall focal length $f$; this system has a relative aperture of 1:0.95, a back-focal length $s=60.64$ and a combined focal length $f_{I-III}$ of 214.1 for the first three lens members I, II, III of the system.

TABLE I

| Lens | | | Radii | Thicknesses and Separations | $n_e$ | $\nu_e$ |
|---|---|---|---|---|---|---|
| F | I | L1 | $r1 = +159.55$ | $d1 = 16.35$ | 1.62287 | 60.1 |
| | | | $r2 = +3,663.75$ | $d2 = 0.19$ | Air space | |
| | II | L2 | $r3 = +229.09$ | $d3 = 10.32$ | 1.66104 | 57.1 |
| | | | $r4 = +607.77$ | $d4 = 6.23$ | Air space | |
| | III | L3 | $r5 = \infty$ | $d5 = 8.37$ | 1.58482 | 40.6 |
| | | | $r6 = +597.26$ | $d6 = 0.19$ | Air space | |
| R | IV | L4 | $r7 = +57.82$ | $d7 = 20.05$ | 1.79180 | 25.9 |
| | | | $r8 = +39.05$ | $d8 = 36.21$ | Air space (Diaphr.) | |
| | V | L5 | $r9 = -39.25$ | $d9 = 4.48$ | 1.76846 | 26.8 |
| | | L6 | $r10 = +478.43$ | $d10 = 28.42$ | 1.71615 | 53.7 |
| | | | $r11 = -57.62$ | $d11 = 0.19$ | Air space | |
| | VI | L7 | $r12 = +317.71$ | $d12 = 17.52$ | 1.59142 | 61.0 |
| | | | $r13 = -116.06$ | $d13 = 0.19$ | Air space | |
| | VII | L8 | $r14 = +94.69$ | $d14 = 16.35$ | 1.69400 | 54.6 |
| | | | $r15 = +509.65$ | | | |
| | | | | $d_{total} = 165.06$ | | |

It will be noted that the sum of the dispersion constants $\nu_e$ of the first three members I, II, III equals 157.8, being therefore less than 175; the axial thickness of the front component F, computed as the sum of the parameters $d1$ to $d7$, equals 61.7 and is thus less than the axial thickness of the rear component R, represented by the sum of the parameters $d9$ to $d14$ and equaling 67.15. Each of the first six radii of curvature ($r1$ to $r6$) is greater than the overall focal length $f$, and the sum of the axial thicknesses and air spaces $d1$ to $d5$ of the three-member front group I–III of component F has a value of 41.46 which is less than $0.4f_{I-III}$.

In FIG. 2 we have shown a modified system according to the invention whose front and rear components F', R' consist, respectively, of four members I' to IV', represented by singlets L1' to L4' and three members V', VI', VII' of which the first one is a doublet composed of lenses L5' and L6' while the other two are singlets L7' and L8'. The radii of curvature, axial thicknesses and air spaces have been designated $r1'$ to $r15'$ and $d1'$ to $d14'$ in analogy with those of the preceding embodiment. The diaphragm is shown at D', the image plane at P' and the back-focal length at $s'$.

In contradistinction to the embodiment of FIG. 1, the objective of FIG. 2 has its first lens member I' constructed as a slightly negative meniscus L1' whereas the meniscus-shaped third member III' is a positively refracting lens L3'. The very small air space $d2'$ between members I' and II' could also be omitted, the confronting surfaces of these members being then replaced by a common cemented surface of a radius whose magnitude may be between those given in the following Table II for the radii $r2'$ and $r3'$. The parameters of Table II define an objective of relative aperture of 1:0.95, overall focal length $f' = 100$, combined focal lengths of the first three members $f_{I'-III'} = 162.2$ and back-focal length $s' = 57.28$; the image diameter or diagonal again exceeds 60% of the focal length $f'$.

TABLE II

| Lens | | | Radii | Thicknesses and Separations | $n_e$ | $\nu_e$ |
|---|---|---|---|---|---|---|
| F' | I' | L1' | $r1' = +142.76$ | $d1' = 8.72$ | 1.67245 | 44.7 |
| | | | $r2' = +130.17$ | $d2' = 0.44$ | Air space | |
| | II' | L2' | $r3' = +139.32$ | $d3' = 17.44$ | 1.62541 | 56.6 |
| | | | $r4' = +540.20$ | $d4' = 0.44$ | Air space | |
| | III' | L3' | $r5' = +114.51$ | $d5' = 15.69$ | 1.62287 | 60.1 |
| | | | $r6' = +282.61$ | $d6' = 0.44$ | Air space | |
| | IV' | L4' | $r7' = +66.70$ | $d7' = 20.92$ | 1.74703 | 27.8 |
| | | | $r8' = +39.28$ | $d8' = 40.54$ | Air space (Diaphr.) | |
| R' | V' | L5' | $r9' = -44.42$ | $d9' = 6.10$ | 1.74703 | 27.8 |
| | | L6' | $r10' = +71.19$ | $d10' = 37.93$ | 1.73692 | 50.8 |
| | | | $r11' = -71.19$ | $d11' = 0.44$ | Air space | |
| | VI' | L7' | $r12' = +399.00$ | $d12' = 13.08$ | 1.71615 | 53.7 |
| | | | $r13' = -149.56$ | $d13' = 0.44$ | Air space | |
| | VII' | L8' | $r14' = +94.64$ | $d14' = 15.69$ | 1.71615 | 53.7 |
| | | | $r15' = +649.26$ | | | |
| | | | | $d_{total} = 178.31$ | | |

In this embodiment, the sum of the dispersion constants $v_e$ of the first three members I', II', III' is again less than 175, being equal to 1.64; the axial thickness of front component F', i.e. the sum of the parameters $d1'$ to $d6'$, equals 64.09 and is thus less than that of the rear component R', i.e. the sum of the parameters $d9'$ to $d14'$ which amounts to 73.64. Each of the first six radii of curvature ($r1'$ to $r6'$) is greater than the overall focal length $f'$, and the sum of the axial thicknesses and air spaces $d1'$ to $d5'$ of the three-member front group I' to III' of component F' has a value 42.73 which is less than $0.4f_{I'-III'}$.

It will be noted that the total axial length of either system, i.e. the sum of the axial thicknesses and air spaces $r1$ to $r15$ (or $r1'$ to $r15'$) and $d1$ to $d14$ (or $d1'$ to $d14'$), is less than 1.8 time the overall focal length $f$ or $f'$ of the objective, the same as in the arrangement disclosed in the above-identified copending application Ser. No. 355,829. Moreover, in both instances, the axial thicknesses of the front and rear menisci IV, IV' and V, V' together amount to more than 50% of the focal length $f$ or $f'$. It will further be apparent that the objective according to our invention may be realized as an optical system with six or seven air-spaced lens members, at least two of them being disposed ahead of the first negative meniscus L4 or L4', depending on whether or not the additional negative lens of the front component F or F' is an independent singlet or is combined into a doublet with another lens of the three-lens group L1, L2, L3 or L1', L2', L3'.

We claim:

1. A high-speed camera objective composed of a front and a rear component whose elements consist, in order from the object side to the image side of the objective, of a first, a second and a third lens; a first meniscus; a second meniscus defining a large air space with said first meniscus, a penultimate lens member; and a rearmost lens member; the radii of curvature $r1$ to $r15$ and the axial thicknesses and separations $d1$ to $d14$ of said first, second and third lenses L1, L2, L3, said first meniscus L4, the elements L5, L6, of said second meniscus, said penultimate lens member L7 and said rearmost lens member L8 having numerical values, based upon a numerical value of 100 for said overall focal length, which together with their refractive indices $n_e$ and dispersion constants $v_e$, based upon the $e$ line of the spectrum, are substantially as given in the following table:

| Lens | Radii | Thicknesses and Separations | $n_e$ | $v_e$ |
|---|---|---|---|---|
| L1 | $r1 = +159.55$ | $d1 = 16.35$ | 1.62287 | 60.1 |
|    | $r2 = +3,663.75$ | $d2 = 0.19$ | Air space | |
| L2 | $r3 = +229.09$ | $d3 = 10.32$ | 1.66104 | 57.1 |
|    | $r4 = +607.77$ | $d4 = 6.23$ | Air space | |
| L3 | $r5 = \infty$ | $d5 = 8.37$ | 1.58482 | 40.6 |
|    | $r6 = +597.26$ | $d6 = 0.19$ | Air space | |
| L4 | $r7 = +57.82$ | $d7 = 20.05$ | 1.79180 | 25.9 |
|    | $r8 = +39.05$ | $d8 = 36.21$ | Air space (Diaphr.) | |
| L5 | $r9 = -39.25$ | $d9 = 4.48$ | 1.76846 | 26.8 |
| L6 | $r10 = +478.43$ | $d10 = 28.42$ | 1.71615 | 53.7 |
|    | $r11 = -57.62$ | $d11 = 0.19$ | Air space | |
| L7 | $r12 = +317.71$ | $d12 = 17.52$ | 1.59142 | 61.0 |
|    | $r13 = -116.06$ | $d13 = 0.19$ | Air space | |
| L8 | $r14 = +94.69$ | $d14 = 16.35$ | 1.69400 | 54.6 |
|    | $r15 = +509.65$ | | | |

2. A high-speed camera objective composed of a front and a rear component whose elements consist, in order from the object side to the image side of the objective, of a first, a second and a third lens; a first meniscus; a second meniscus defining a large air space with said first meniscus, a penultimate lens member; and a rearmost lens member; the radii of curvature $r1'$ to $r15'$ and the axial thicknesses and separations $d1'$ to $d14'$ of said first, second and third lenses L1', L2', L3', said first meniscus L4', the elements L5', L6' of said second meniscus, said penultimate lens member L7' and said rearmost lens member L8' having numerical values, based upon a numerical value of 100 for said overall focal length, which together with their refractive indices $n_e$ and dispersion constants $v_e$, based upon the $e$ line of the spectrum, are substantially as given in the following table:

| Lens | Radii | Thicknesses and Separations | $n_e$ | $v_e$ |
|---|---|---|---|---|
| L1' | $r1' = +142.76$ | $d1' = 8.72$ | 1.67245 | 44.7 |
|     | $r2' = +130.17$ | $d2' = 0.44$ | Air space | |
| L2' | $r3' = +139.32$ | $d3' = 17.44$ | 1.62541 | 56.6 |
|     | $r4' = +540.20$ | $d4' = 0.44$ | Air space | |
| L3' | $r5' = +114.51$ | $d5' = 15.69$ | 1.62287 | 60.1 |
|     | $r6' = +282.61$ | $d6' = 0.44$ | Air space | |
| L4' | $r7' = +66.70$ | $d7' = 20.92$ | 1.74703 | 27.8 |
|     | $r8' = +39.28$ | $d8' = 40.54$ | Air space (Diaphr.) | |
| L5' | $r9' = -44.42$ | $d9' = 6.10$ | 1.74703 | 27.8 |
| L6' | $r10' = +71.19$ | $d10' = 37.93$ | 1.73692 | 50.8 |
|     | $r11' = -71.19$ | $d11' = 0.44$ | Air space | |
| L7' | $r12' = +399.00$ | $d12' = 13.08$ | 1.71615 | 53.7 |
|     | $r13' = -149.56$ | $d13' = 0.44$ | Air space | |
| L8' | $r14' = +94.64$ | $d14' = 15.69$ | 1.71615 | 53.7 |
|     | $r15' = +649.26$ | | | |

References Cited

UNITED STATES PATENTS 3,190,176   6/1965   Buzawa _____ 350—214

JEWELL H. PEDERSEN, *Primary Examiner.*

R. J. STERN, *Assistant Examiner.*